US011019290B2

(12) United States Patent
Tanaka

(10) Patent No.: US 11,019,290 B2
(45) Date of Patent: May 25, 2021

(54) IMAGE CAPTURING APPARATUS, CONTROL METHOD THEREFOR, AND STORAGE MEDIUM

(71) Applicant: CANON KABUSHIKI KAISHA, Tokyo (JP)

(72) Inventor: Masanori Tanaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/821,298

(22) Filed: Mar. 17, 2020

(65) Prior Publication Data

US 2020/0322554 A1    Oct. 8, 2020

(30) Foreign Application Priority Data

Apr. 3, 2019    (JP) .............................. JP2019-071508

(51) Int. Cl.
*H04N 5/357*    (2011.01)
*H04N 5/369*    (2011.01)
*H04N 5/378*    (2011.01)

(52) U.S. Cl.
CPC ....... *H04N 5/3577* (2013.01); *H04N 5/36961* (2018.08); *H04N 5/378* (2013.01)

(58) Field of Classification Search
CPC .. H04N 5/357; H04N 5/3577; H04N 5/36961; H04N 5/378
See application file for complete search history.

(56) References Cited

U.S. PATENT DOCUMENTS

| | | | | |
|---|---|---|---|---|
| 2012/0307120 | A1* | 12/2012 | Ito | H04N 5/378 |
| | | | | 348/302 |
| 2016/0316166 | A1* | 10/2016 | Kubo | H04N 5/3742 |
| 2017/0195603 | A1* | 7/2017 | Kawazu | H04N 9/045 |
| 2018/0234656 | A1* | 8/2018 | Krymski | H04N 5/3742 |
| 2020/0366863 | A1* | 11/2020 | Etou | H01L 27/14612 |

FOREIGN PATENT DOCUMENTS

JP    5531797 B    6/2014

* cited by examiner

*Primary Examiner* — Amy R Hsu
(74) *Attorney, Agent, or Firm* — Carter, DeLuca & Farrell LLP

(57) ABSTRACT

An image capturing apparatus comprises a pixel portion in which a plurality of pixels are arranged in a matrix, vertical output lines arranged in such a manner that a plurality of vertical output lines are provided for each pixel column in the pixel portion, each of the plurality of vertical output lines provided for one pixel column being connected to a pixel in different rows within the one pixel column; and a readout circuit configured to, when simultaneously reading out signals of pixels in a plurality of rows within the one pixel column using the plurality of vertical output lines provided within the one pixel column, continuously read out same signals multiple times with respect to at least a pixel in one row among the pixels in the plurality of rows.

14 Claims, 14 Drawing Sheets

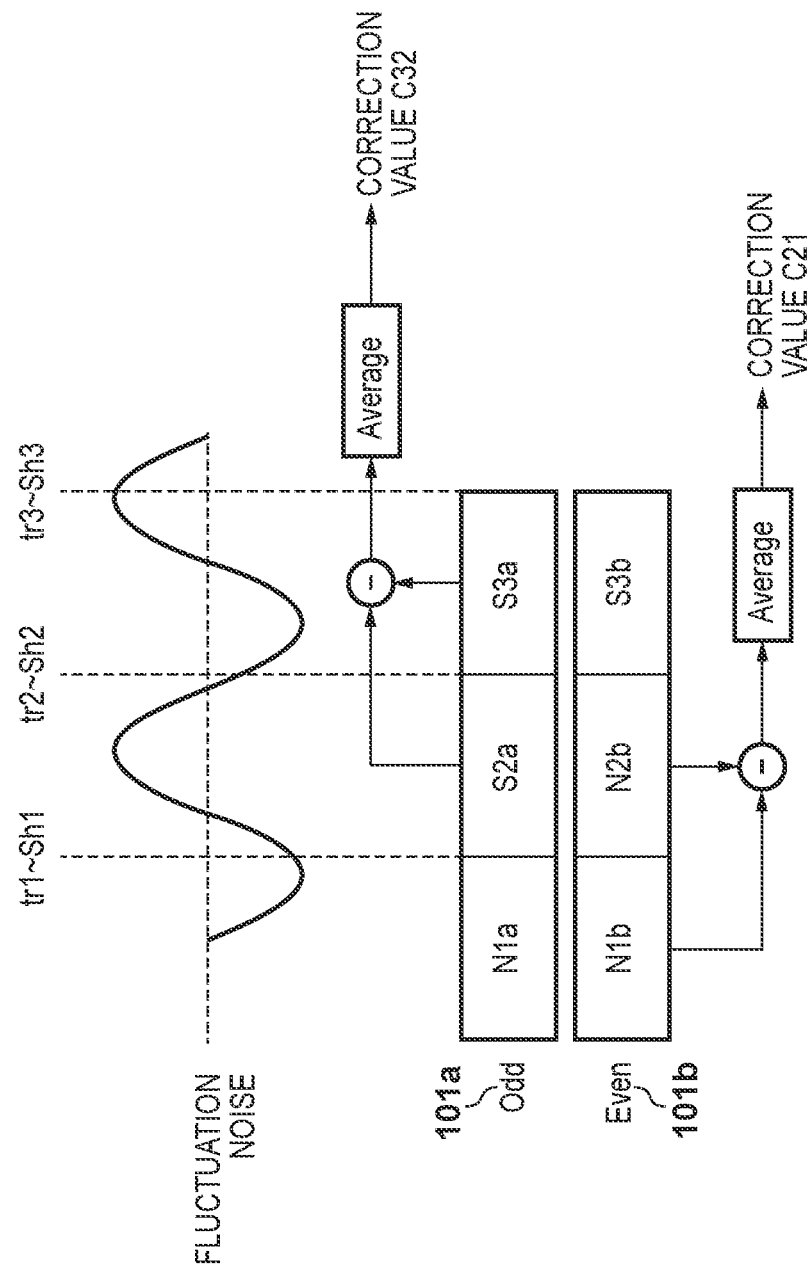

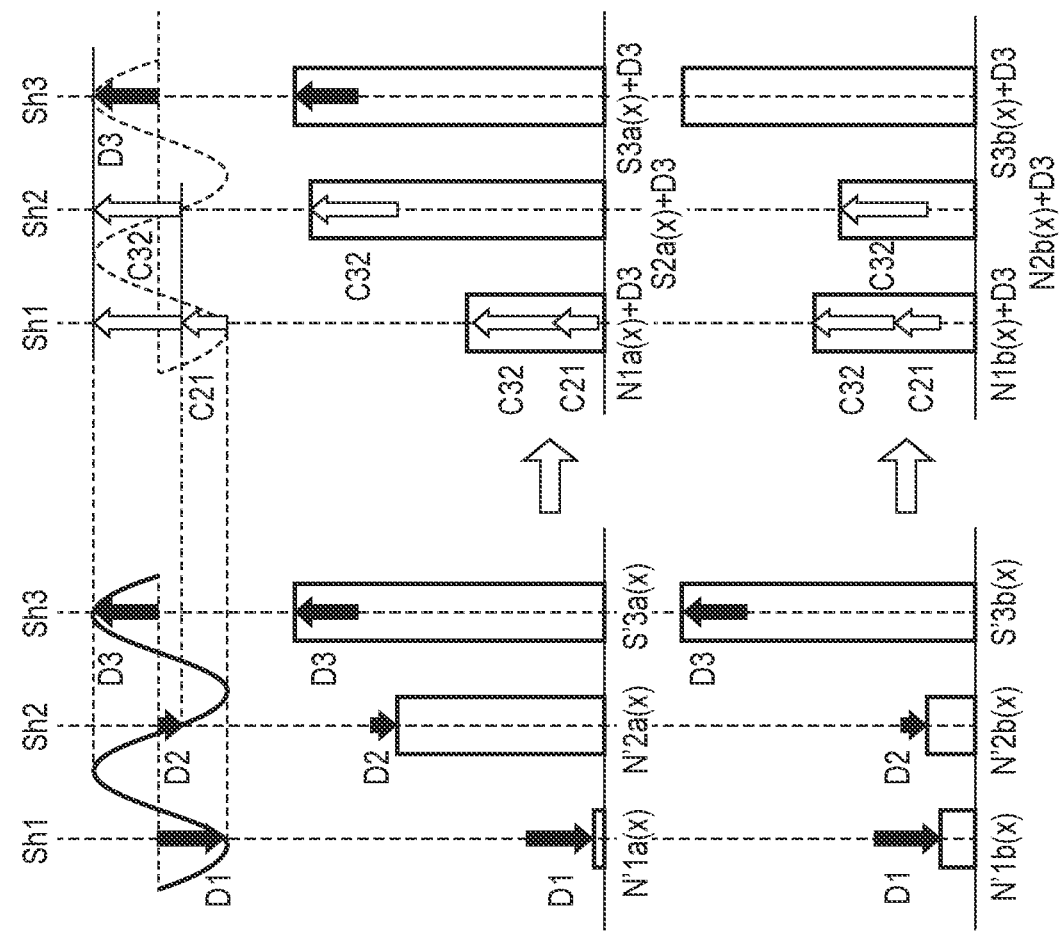
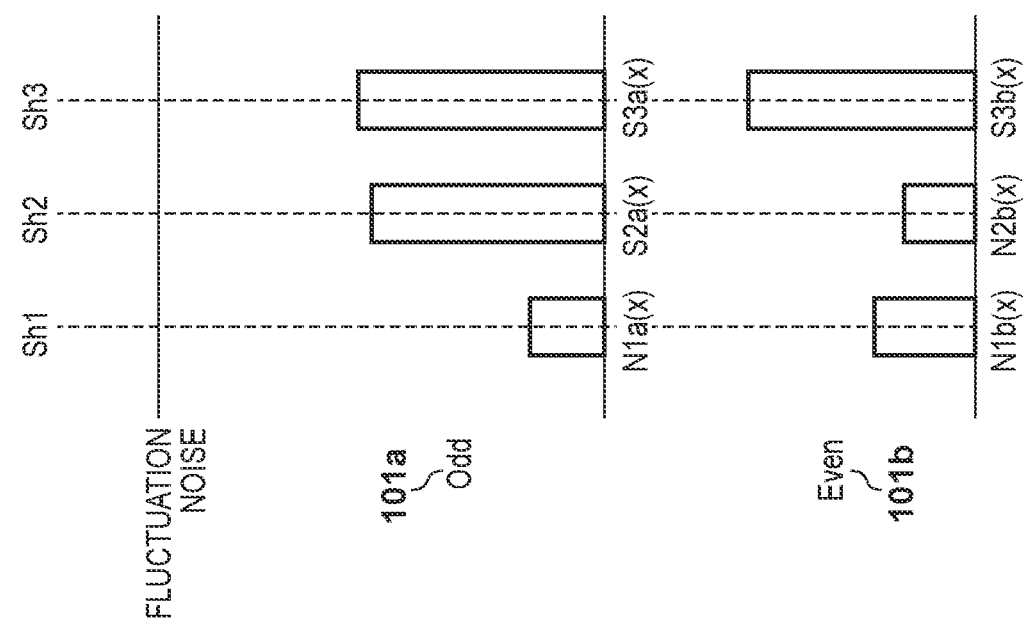

IMAGE CAPTURING APPARATUS, CONTROL METHOD THEREFOR, AND STORAGE MEDIUM

BACKGROUND OF THE INVENTION

Field of the Invention

The invention relates to a noise reduction technique in an image capturing apparatus.

Description of the Related Art

Conventionally, there is a known method that suppresses random noise with respect to signals in a CMOS-type image sensor by performing AD conversion multiple times and performing summation, or summation and averaging, when signals are read out.

For example, according to Japanese Patent No. 5531797, random noise included in signals that have been read out is suppressed by continuously applying AD conversion to output signals of a pixel multiple times and summing the results of the AD conversion.

However, although such a method can reduce random noise, suppression of random noise leads to prominent pattern noise that is attributed to other factors, such as power source fluctuations and exogenous noise, and that was not conventionally prominent.

SUMMARY OF THE INVENTION

The present invention has been made in view of the aforementioned problem, and provides an image capturing apparatus that can suppress pattern noise attributed to power source fluctuations and exogenous noise while suppressing random noise in output signals of an image sensor.

According to a first aspect of the present invention, there is provided an image capturing apparatus comprising: a pixel portion in which a plurality of pixels are arranged in a matrix; vertical output lines arranged in such a manner that a plurality of vertical output lines are provided for each pixel column in the pixel portion, each of the plurality of vertical output lines provided for one pixel column being connected to a pixel in different rows within the one pixel column; and a readout circuit configured to, when simultaneously reading out signals of pixels in a plurality of rows within the one pixel column using the plurality of vertical output lines provided within the one pixel column, continuously read out same signals multiple times with respect to at least a pixel in one row among the pixels in the plurality of rows.

According to a second aspect of the present invention, there is provided a method of controlling an image capturing apparatus including a pixel portion in which a plurality of pixels are arranged in a matrix, and vertical output lines arranged in such a manner that a plurality of vertical output lines are provided for each pixel column in the pixel portion, each of the plurality of vertical output lines provided for one pixel column being connected to a pixel in different rows within the one pixel column, the method comprising: when simultaneously reading out signals of pixels in a plurality of rows within the one pixel column using the plurality of vertical output lines provided within the one pixel column, continuously reading out same signals multiple times with respect to at least a pixel in one row among the pixels in the plurality of rows.

Further features of the present invention will become apparent from the following description of exemplary embodiments with reference to the attached drawings.

BRIEF DESCRIPTION OF THE DRAWINGS

FIG. 5 is a diagram showing timings for obtaining correction values according to the first embodiment.

FIGS. 6A and 6B are diagrams for describing a correction operation according to the first embodiment.

DESCRIPTION OF THE EMBODIMENTS

Figure 1:
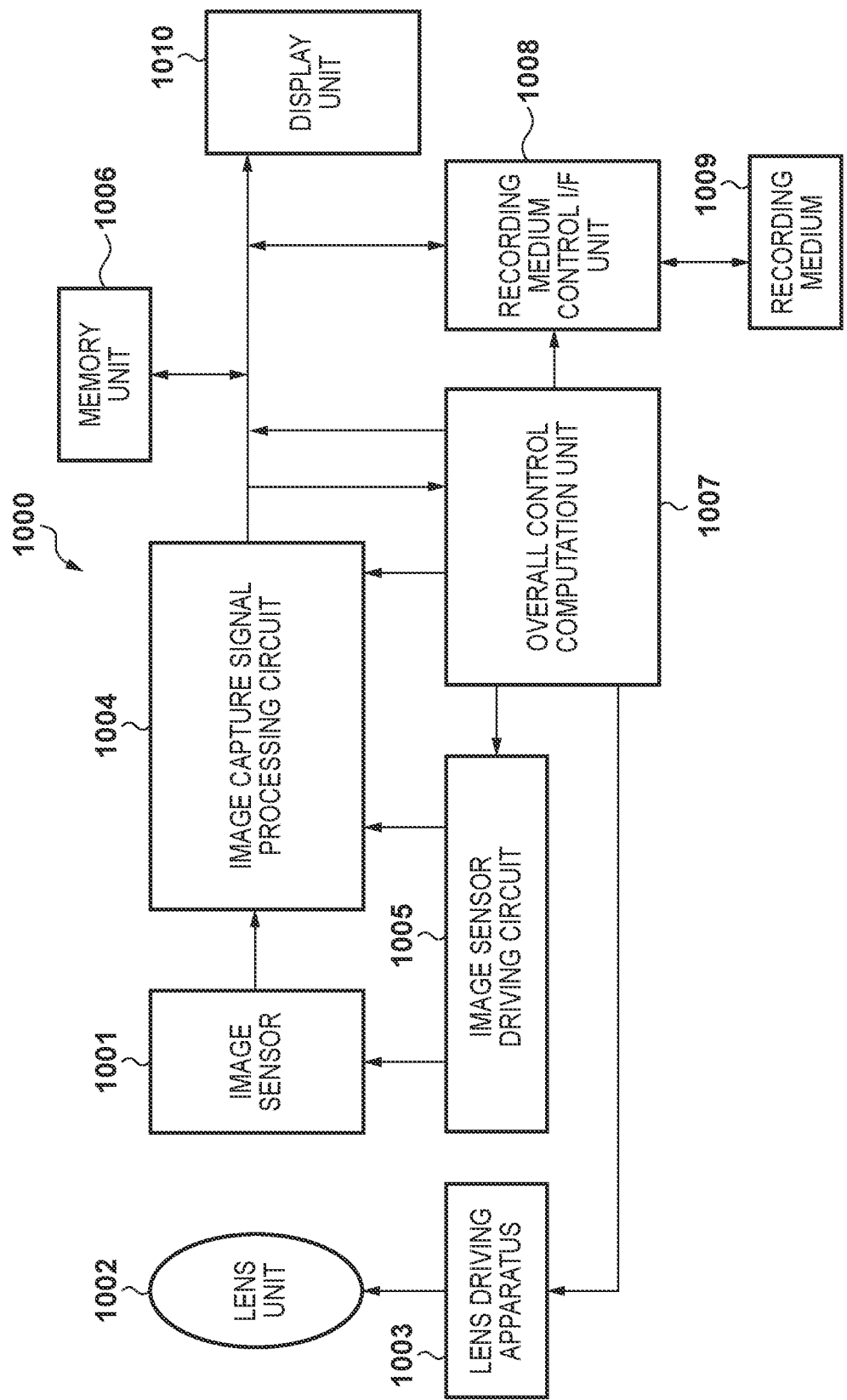
FIG. 1 is a diagram showing a configuration of a digital camera as a first embodiment of an image capturing apparatus of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a diagram showing a configuration of a digital camera 1000 as a first embodiment of an image capturing apparatus of the present invention.

In FIG. 1, a lens unit 1002 forms an optical image of a subject on an image sensor 1001. Also, a lens driving apparatus 1003 performs zoom control, focus control, diaphragm control, camera shake correction control, and the like. An image capture signal processing circuit 1004 applies various types of correction processing, data compression processing, and the like to image signals output from the image sensor 1001. A shooting element driving circuit 1005 outputs instruction signals as well as various types of timing signals for various types of power sources and shooting modes, to the image sensor 1001.

Here, the image sensor 1001 used in the present embodiment can suppress fluctuation noise attributed to power source fluctuations as will be described later in detail. It is thus possible to simplify and reduce the weight of a power source circuit. Furthermore, the image sensor 1001 can suppress fluctuation noise attributed to exogenous noise as will be described later. It is thus possible to install an actuator, such as a coil, intended for camera shake correction in the vicinity of the image sensor 1001.

A memory unit 1006 functions as a memory for temporarily storing image data, and an overall control computation unit 1007 controls various types of computations and the entirety of a camera system. A recording medium control I/F unit 1008 is an interface for recording data to a recording medium, or reading out data from the recording medium. A recording medium 1009 is an attachable and removable semiconductor memory for recording or reading out image data. Also, a display unit 1010 is a display device, such as a liquid crystal display apparatus, that displays various types of information and shot images.

Figure 2:
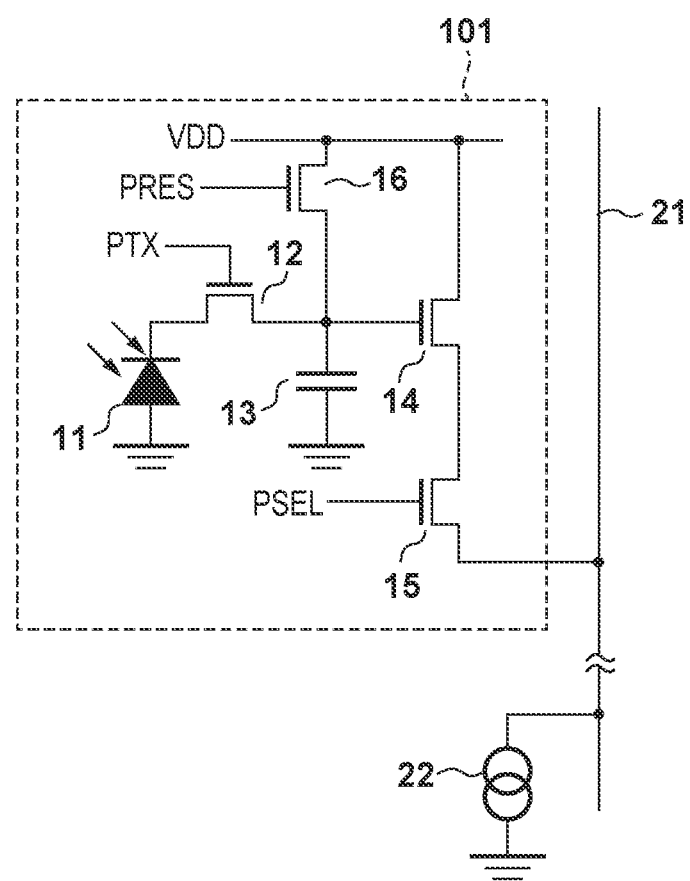
FIG. 2 is a diagram showing a configuration of a pixel circuit of an image sensor according to the first embodiment.

FIG. 2 is a diagram showing a configuration of a pixel circuit of the image sensor 1001 used in the present embodiment.

In FIG. 2, a unit pixel 101 is composed of a photodiode (hereinafter "PD") 11, a transfer switch 12, a floating diffusion (hereinafter "FD") 13, an amplification transistor 14, a row selection switch 15, and a reset switch 16.

The PD 11 generates a charge corresponding to light incident via an optical system. The transfer switch 12 is driven by a transfer pulse PTX that is input to its gate terminal, and transfers the charge generated by the PD 11 to the FD 13. The FD 13 functions as a charge-voltage conversion unit that temporarily stores the charge and converts the stored signal charge into a signal voltage. The amplification transistor 14 functions as a source follower together with a constant current circuit 22, and a signal that has undergone the charge-voltage conversion in the FD 13 is input to its gate. The row selection switch 15 is driven by a row selection pulse PSEL that is input to its gate, and its drain and source are respectively connected to the amplification transistor 14 and a vertical output line 21.

When the row selection pulse PSEL is at the Hi level, the row selection switch 15 is in a conductive state, and a source of the corresponding amplification transistor 14 is connected to the vertical output line 21. The vertical output line 21 is connected to the constant current circuit 22, and functions as a source follower together with the amplification transistor 14 that is connected thereto via the row selection switch 15. At this time, the signal potential of the FD 13 is reflected in the potential of the vertical output line 21. Furthermore, a plurality of unit pixels 101 that are arrayed in a column direction are connected to the vertical output line 21.

The reset switch 16 has a drain connected to a power source VDD, is driven by a reset pulse PRES that is input to its gate, and removes the charge stored in the FD 13.

Here, in a state where the FD 13 has been reset using the reset pulse PRES, the amplification transistor 14 outputs a reset signal to the vertical output line 21. Also, when the charge generated by the PD 11 has been transferred using the transfer pulse PTX, a transfer signal including a photoelectric conversion signal of the PD 11 is output to the vertical output line 21.

Note that the FD 13 is composed of a parasitic capacitance in connection with the connected transfer switch 12, amplification transistor 14, and reset switch 16, and a parasitic capacitance between wires. Therefore, the FD 13 has a minute capacitance, and is easily influenced by power source fluctuations and exogenous noise, such as transitions of the power source VDD and various types of control pulses, when the aforementioned signals are output.

Figure 3:
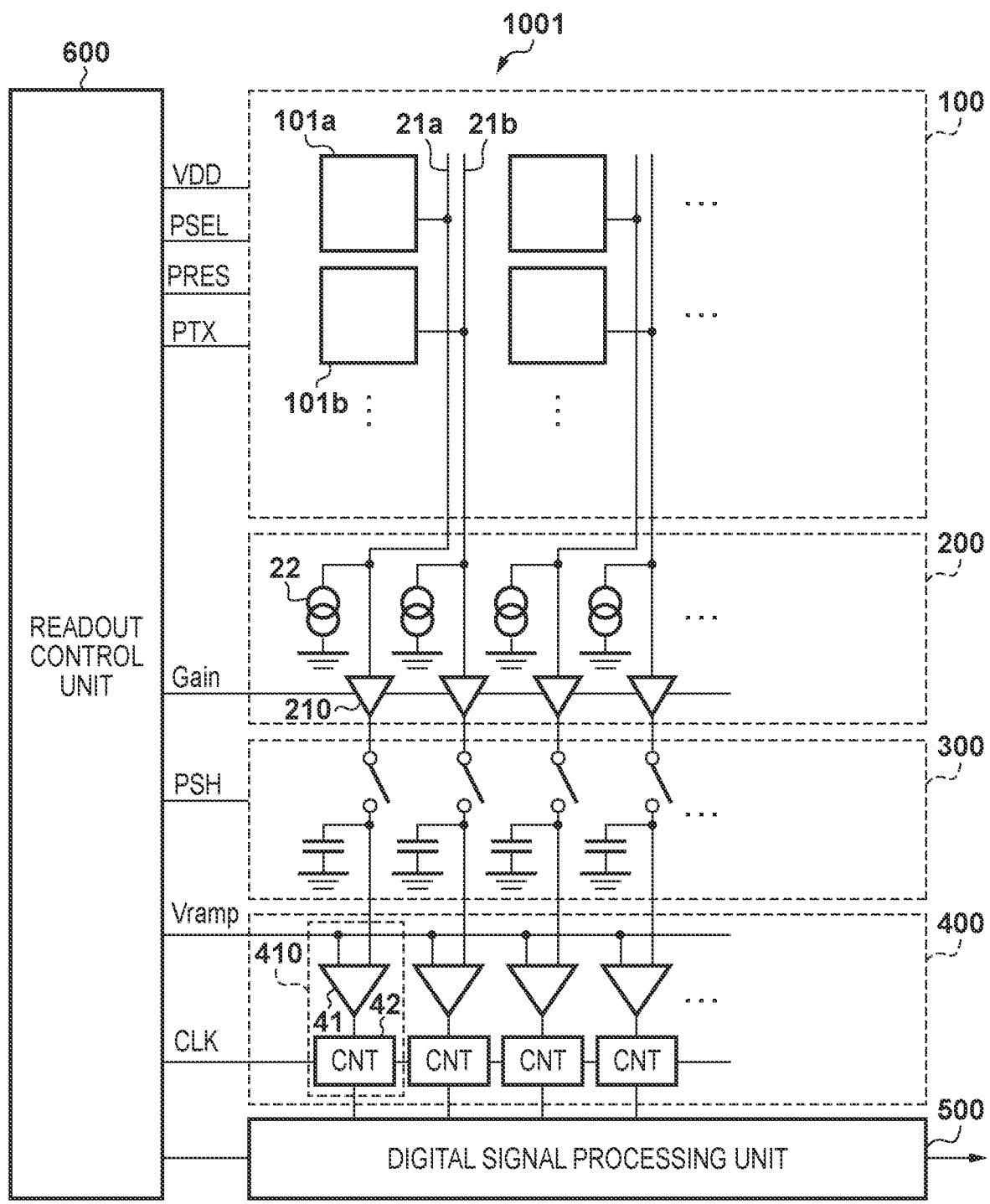
FIG. 3 is a diagram showing a circuit configuration of the image sensor according to the first embodiment.

FIG. 3 is a diagram showing a circuit configuration of the image sensor 1001 according to the present embodiment.

In FIG. 3, a pixel array (pixel portion portion) 100 includes unit pixels 101 that are arrayed in a matrix, and vertical output lines 21 per pixel column. Here, in the pixel array 100 according to the present embodiment, two (a plurality of) vertical output lines 21a and 21b are provided with respect to one column of unit pixels. A unit pixel 101a that belongs to an odd-numbered row within the pixel column is connected to the vertical output line 21a, and a unit pixel 101b that belongs to an even-numbered row is connected to the vertical output line 21b.

In this way, two rows (a plurality of rows), namely the unit pixel 101a in the odd-numbered row and the unit pixel 101b in the even-numbered row, can be read out simultaneously. On the other hand, however, the influence of exogenous noise, such as fluctuations in the power sources and various types of control pulses, is exerted at the same time; this, as a result, can be the cause of appearance of pattern-like noise in an image.

A signal amplification unit 200 includes a plurality of signal amplification circuits 210 that are provided in correspondence with respective vertical output lines 21a and 21b. The signal amplification circuits 210 are amplifiers that apply a gain to signals of the vertical output lines 21a and 21b, and can change a gain setting using a gain setting signal Gain. Note that, although it is desirable to provide the signal amplification unit 200 in terms of noise reduction, it may not necessarily be indispensable and may be omitted.

A sample and hold unit 300 samples and holds voltage signals output from the signal amplification unit 200 in accordance with a control signal PSH, and outputs the voltage signals to an AD conversion unit 400 in a following stage. The AD conversion unit 400 is composed of a plurality of AD conversion circuits 410, and the AD conversion circuits 410 each include a comparator 41 and a counter 42.

In the comparator 41, a signal output from the sample and hold unit 300 is input to one input terminal, a reference signal Vramp that changes gradually is input to the other input terminal, and the result of comparing these signals is output.

A reference clock CLK and a count control pulse CNTen are input to the counter 42, and when the count control pulse CNTen is at the Hi level, the counter 42 starts counting up or down based on the reference clock CLK. Also, the counter 42 stops counting in accordance with a comparison result CMP output from the comparator 41, and AD conversion is performed through these operations.

Note that the AD conversion method used in the present embodiment is not limited to the foregoing AD conversion method of a slope type, and other AD conversion methods are also applicable.

A digital signal processing unit 500 applies various types of signal processing to digital signals input from the AD conversion unit 400, and outputs obtained image data to the outside of the image sensor 1001. A readout control unit 600 generates the power source VDD and various types of pulses PTX, PSEL, and PRES that are input to the unit pixels 101, as well as the reference signal Vramp, the reference clock CLK, and the count control pulse CNTen that are input to the AD conversion circuits 410, and supplies them to respective components.

Figure 4:
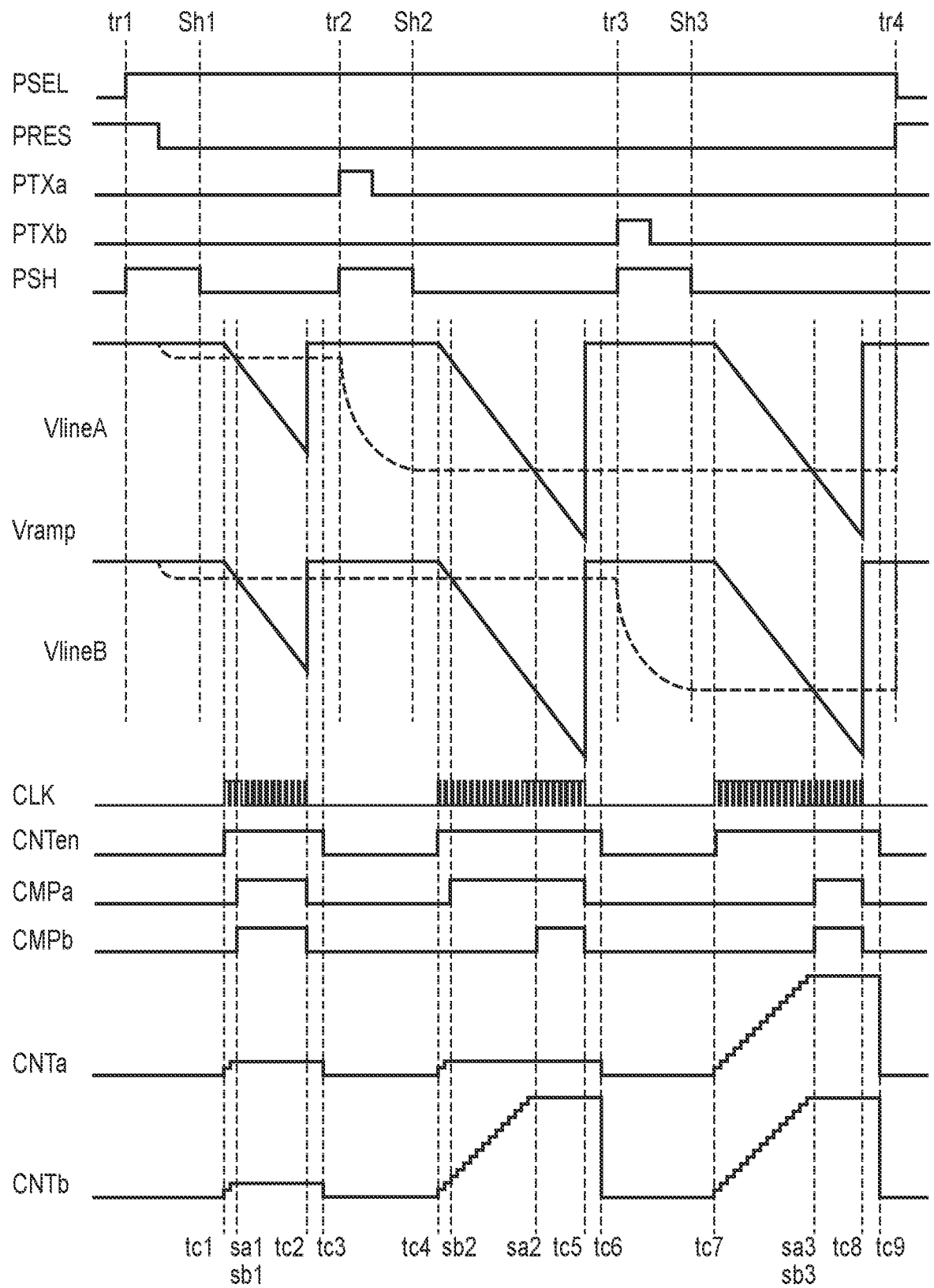
FIG. 4 is a timing chart showing signal readout operations according to the first embodiment.

FIG. 4 is a timing chart showing signal readout operations according to the present embodiment.

In the pixel array 100 according to the present embodiment, two rows are read out simultaneously by utilizing the two vertical output lines 21a and 21b that are provided per column. Here, when the operations are differentiated or different between an odd-numbered row and an even-numbered row in the readout operations, alphabetical characters a and b are appended to terms, as in the case of a transfer pulse PTXa and a transfer pulse PTXb, for discrimination, and the operations for the odd-numbered row are discriminated from the operations for the even-numbered row (a for the odd-numbered row, and b for the even-numbered row).

From time tr1 to time tr4, which is a readout period, PSEL for rows to be read out is "H", and signals of the unit pixels 101a and 101b in the rows to be read out are respectively output to the corresponding vertical output lines 21a and 21b.

At time tr1, PRES is in the "H" state, an unnecessary charge of the FD 13 is discharged, and the potential of the FD 13 is reset. Thereafter, PRES becomes "L". At this time, the unit pixels 101a, and 101b output reset signals to the vertical output lines 21a and 21b. It takes a stabilization period for the reset signals to be reflected in the vertical output lines 21a and 21b, and the reset signals are input to the sample and hold unit 300 via the signal amplification unit 200. Also, at time tr1, the control signal PSH enters the "H" state, and the sample and hold unit 300 samples the signals output from the signal amplification unit 200.

Thereafter, at time sh1 at which the stabilization of the reset signals output to the vertical output lines 21a and 21b ends, the control signal PSH becomes "L", and the sample and hold unit 300 holds the reset signals output from the signal amplification unit 200 and outputs them to the AD conversion unit 400. Then, the AD conversion unit 400 applies the AD conversion to the signals input from the sample and hold unit 300.

At time tc1, the readout control unit 600 outputs the reference signal Vramp, which changes gradually, to the comparators 41. Also, at the same time, the count control pulse CNTen becomes "H", and the counters 42 start counting upon input of the reference clock CLK to the counters 42, thereby starting the AD conversion. Thereafter, at a time when the reference signal Vramp falls below the reset signals, the comparators 41 invert the outputs CMPa and CMPb. Here, the inversion time of the comparator 41 corresponding to the vertical output line 21a is represented as sa1, and the inversion time of the comparator 41 corresponding to the vertical output line 21b is represented as sb1. When the outputs CMPa and CMPb of the comparators 41 are inverted, the counters 42 stop the counting operation.

When the reference signal Vramp reaches a predetermined potential at time tc2, the reference signal Vramp is reset to an initial value, and the reference clock CLK stops.

At time tc3, CNTen becomes "L", and the counters 42 output the count values, which are the results of applying the AD conversion to the reset signals, to the digital signal processing unit 500, and then reset the count values.

Thereafter, at time tr2, the transfer pulse PTXa becomes "H", and the charge stored in the PD 11 included in the unit pixel 101a due to exposure to light is transferred to the FD 13. Then, the transfer pulse PTXa becomes "L", and the unit pixel 101a outputs a transfer signal to the vertical output line 21a. It takes a stabilization period for the transfer signal to be reflected in the vertical output line 21a, and the transfer signal is input to the sample and hold unit 300 via the signal amplification unit 200. On the other hand, the unit pixel 101b remains in the state where it outputs the reset signal.

Also, at time tr2, the control signal PSH enters the "H" state, and the sample and hold unit 300 samples the signals output from the signal amplification unit 200. Thereafter, at time sh2 at which the stabilization of the transfer signal output to the vertical output line 21a ends, the control signal PSH becomes "L", and the sample and hold unit 300 holds the reset signal of the unit pixel 101b and the transfer signal of the unit pixel 101a that have been output from the signal amplification unit 200, and outputs them to the AD conversion unit 400.

Note that the operations at time tr2 may be started without waiting for the operations at time tc1 because the AD conversion unit 400 and the signal amplification unit 200 are disconnected from each other at the end of the sampling operation at time sh1.

Thereafter, from time tc4 to tc6, the AD conversion unit 400 applies the AD conversion to the signals held by the sample and hold circuit 300. Note that, while the readout operations at times tc4, tc5, and tc6 are substantially equivalent to the readout operations at times tc1, tc2, and tc3, as the potential signal range of the transfer signal is broader than that of the reset signal, the potential reached by the reference signal Vramp, which is that at a timing at which the AD conversion ends, is different.

Here, the unit pixel 101a has output the transfer signal and the unit pixel 101b has output the reset signal, and the results of applying the AD conversion to the respective signals are output to the digital signal processing unit 500. Thereafter, at time tr3, the transfer pulse PTXb becomes "H", and the charge stored in the PD 11 included in the unit pixel 101b is transferred to the FD 13. Then, the transfer pulse PTXb becomes "L", and the unit pixel 101b outputs a transfer signal to the vertical output line 21b. It takes a stabilization period for the transfer signal to be reflected in the vertical output line 21b, and the transfer signal is input to the sample and hold unit 300 via the signal amplification unit 200.

On the other hand, the unit pixel 101a remains in a state where it outputs the transfer signal. Furthermore, at time tr3, the control signal PSH enters the "H" state, and the sample and hold unit 300 samples the signals output from the signal amplification unit 200.

Thereafter, at time sh3 at which the stabilization of the transfer signal output to the vertical output line 21b ends, the control signal PSH becomes "L", and the sample and hold unit 300 holds the transfer signals output from the signal amplification unit 200 and outputs them to the AD conversion unit 400.

The readout operations at times tc7, tc8, and tc9 are equivalent to the readout operations at times tc4, tc5, and tc6, and the AD conversion unit 400 applies the AD conversion to the signals held by the sample and hold circuit 300.

Both of the unit pixels 101a and 101b have output the transfer signals, and the results of applying the AD conversion to the respective signals are output to the digital signal processing unit 500. The signal readout operations of the present embodiment are executed through the foregoing operations.

The reset signals and the transfer signals read out through the foregoing operations thereafter undergo correlated double sampling (CDS) processing in the digital signal processing unit 500. Specifically, subtracting a digital value of a reset signal from a digital value of a transfer signal makes it possible to extract only an amount that has changed before and after the charge stored in the PD 11 is transferred to the FD 13, that is to say, a signal amount obtained through the photoelectric conversion. This can cancel out the influence of threshold variations of transistors included in the unit pixels 101, and the influence of switching noise that is generated in the reset switch 16 when resetting the FD 13.

Meanwhile, as the aforementioned CDS processing requires the reset signals and the transfer signals to be output using the same circuit, it is necessary to obtain these signals at different times. In this case, due to the influence of fluctuation noise that changes in a time direction, such as power source fluctuations and exogenous noise, the state of noise at the time of output of the reset signals and the state of noise at the time of output of the transfer signals may change. Such noise cannot be removed by the aforementioned CDS processing, and appears as pattern-like noise in an image. In view of this, in the present embodiment, processing for cancelling out fluctuation noise that changes in the time direction is also performed.

FIG. 5 is a diagram showing a relationship between a sample and hold operation in the readout operations that have been described with reference to FIG. 4 and fluctuation noise that changes in the time direction. In a period from tr1 to sh1 in FIG. 4, both of the unit pixel 101a that belongs to an odd-numbered row and the unit pixel 101b that belongs to an even-numbered row output reset signals. The reset signals that are output during this period are represented as N1a and N1b. The reset signals N1a and N1b are held and read out at time sh1.

In a period from tr2 to sh2 in FIG. 4, the unit pixel 101a that belongs to the odd-numbered row outputs a transfer signal, and the unit pixel 101b that belongs to the even-numbered row outputs a reset signal. The transfer signal and the reset signal that are output during this period are represented as S2a and N2b, respectively. The transfer signal S2a and the reset signal N2b are held and read out at time sh2.

In a period from tr3 to sh3 in FIG. 4, both the unit pixel 101a that belongs to the odd-numbered row and the unit pixel 101b that belongs to the even-numbered row output transfer signals. The transfer signals that are output during this period are represented as S3a and S3b. The transfer signals S3a and S3b are held and read out at time sh3. Here, due to fluctuation noise, noise corresponding to the fluctuation amounts at times sh1, sh2, and sh3, at which sampling and holding are performed, is generated in the reset signals and the transfer signals. Meanwhile, in the readout operations of the present embodiment, as the unit pixel 101b continuously outputs the reset signals N1b and N2b at times sh1 and sh2, a difference C21 in a fluctuation noise amount between time sh1 and time sh2 (temporally different timings) can be extracted.

Similarly, as the unit pixel 101a continuously outputs the transfer signals S2a and S3a at times sh2, sh3, a difference C32 in a fluctuation noise amount between time sh2 and time sh3 (temporally different timings) can be extracted.

Here, although a correction value C21 can be obtained by subtracting the reset signal N1b from the reset signal N2b of one certain unit pixel 101b, the reset signals N1b and N2b of one unit pixel are also influenced by, for example, thermal noise, RTS noise, and the like in addition to fluctuation noise. Therefore, it is desirable to generate the result of subtracting the reset signal N1b from the reset signal N2b for each of a plurality of unit pixels 101b that have been read out simultaneously, and perform averaging processing with respect to the generated results.

A description will now be given of a case where the correction value C21 is obtained by performing processing for summating and averaging the rows of unit pixels that have been read out simultaneously as one example of averaging processing.

Provided that the reset signals N1 and N2 of a unit pixel 101b at a certain column address x are respectively represented as N1b(x) and N2b(x), and the number of pixels in unit pixels 101b that are read out simultaneously is Xmax, the correction value C21 is expressed as follows.

$$C21 = \frac{1}{X\max} \sum_{k=1}^{Xmax} \{N2b(k) - N1b(k)\}$$

The same goes for obtaining a correction value C32; provided that the transfer signals S2 and S3 of a unit pixel 101a at a certain column address x are respectively represented as S2a(x) and S3a(x), and the number of pixels in unit pixels 101a that are read out simultaneously is Xmax, the correction value C32 is expressed as follows.

$$C32 = \frac{1}{X\max} \sum_{k=1}^{Xmax} \{S3a(k) - S2a(k)\}$$

The foregoing averaging processing is performed in the digital signal processing unit 500.

Using these two correction values C21 and C32, the reset signals and the transfer signals of the unit pixels 101a and 101b read out simultaneously are corrected. Note that it is desirable that the correction values C21 and C32 correlate highly with the corrected reset signals and transfer signals. Therefore, it is desirable that the rows to which the unit pixels 101a and 101b that are read out simultaneously belong are in an adjacent relationship.

Also, in order to increase correlation, the correction values C21 and C32 may be calculated per column address x, and calculation of a weighted average, a moving average, and the like may be used in the averaging processing. Furthermore, when the image sensor 1001 includes color filters of a Bayer array, unit pixels that have color filters of the same color or are in nearby transmissive wavelength ranges may be assigned as the unit pixels 101a and 101b.

FIGS. 6A and 6B are diagrams for describing an operation of the digital signal processing unit 500 to suppress fluctuation noise according to the present embodiment. FIGS. 6A and 6B show output signals of unit pixels 101a and 101b at a column address x in certain rows to be read out. Also, FIG. 6A shows examples of ideal output signals with no fluctuation noise.

The unit pixel 101a outputs a reset signal N1a(x) and transfer signals S2a(x) and S3a(x). Of these, the transfer signals S2a(x) and S3a(x) are obtained by sampling the same signal twice, and summing and averaging these transfer signals can suppress the influence of random noise, such as thermal noise and RTS noise.

Then, subtracting the reset signal N1a(x) from the result of summing and averaging the transfer signals, that is to say, performing the CDS processing, makes it possible to obtain a photoelectric conversion signal Pa(x). The photoelectric conversion signal Pa(x) is expressed as follows.

$$Pa(x) = \{S2a(x) + S3a(x)\}/2 - N1a(x) \qquad (1)$$

The unit pixel 101b outputs reset signals N1b(x) and N2b(x) and a transfer signal S3b(x). Of these, the reset signals N1b(x) and N2b(x) are obtained by sampling the same signal twice, and summing and averaging these reset signals can suppress the influence of random noise, such as thermal noise and RTS noise.

Then, subtracting the result of summing and averaging the reset signals from the transfer signal $S3b(x)$, that is to say, performing the CDS processing, makes it possible to obtain a photoelectric conversion signal $Pb(x)$. The photoelectric conversion signal $Pb(x)$ is expressed as follows.

$$Pb(x)=S3b(x)-\{N1b(x)+N2b(x)\}/2 \quad (2)$$

Performing the foregoing calculation operations in the digital signal processing unit 500 enables high-image-quality signal processing that suppresses random noise. In reality, however, even if the foregoing processing has been performed, pattern-like noise appears as each signal is influenced by fluctuation noise.

FIG. 6B is a diagram showing examples of output signals in a case where fluctuation noise has occurred in addition to the state of FIG. 6A.

It is assumed that the fluctuation noise amounts that were generated at the timings of sample and hold times sh1, sh2, and sh3 are D1, D2, and D3, respectively. Under the influence of the foregoing fluctuation noise D1, D2, and D3, the signals N1a, S2a, and S3a output from the unit pixel 101a and the signals N1b, N2b, and S3b output from the unit pixel 101b respectively have values expressed as follows.

$$N1a'(x)=N1a(x)+D1$$

$$S2a'(x)=S2a(x)+D2$$

$$S3a'(x)=S3a(x)+D3$$

$$N1b'(x)=N1b(x)+D1$$

$$N2b'(x)=N2b(x)+D2$$

$$S3b'(x)=S3b(x)+D3$$

Note that, whereas the values on the left-hand side of the foregoing expressions are values that are actually obtained, the values on the right-hand side, namely the values of the signals N1a, S2a, S3a, N1b, N2b, and S3b of the unit pixels 101, which have no fluctuation noise, and the fluctuation noise D1, D2, and D3, are unknown.

However, as the unit pixel 101b continuously outputs the reset signals $N1b(x)$ and $N2b(x)$ at times sh1 and sh2, it is apparent that the correction value C21 corresponds to a difference D2−D1 between the fluctuation noise amounts. Similarly, it is apparent that the correction value C32 corresponds to a difference D3−D2 between the fluctuation noise amounts.

$$C21=D2-D1$$

$$C32=D3-D2$$

Therefore, the present embodiment utilizes this in performing processing for suppressing fluctuation noise. To suppress fluctuation noise, first, the fluctuation noise amounts of the signals that were obtained at times sh1 and sh2 are converted into the fluctuation noise amounts at time sh3 using the correction values C21 and C32. The following is obtained by presenting a signal to be obtained on the left-hand side, and known values and their expression to be used in calculation on the right-hand side.

$$N1a(x)+D3=N1a'(x)+C21+C32$$

$$S2a(x)+D3=S2a'(x)+C32$$

$$S3a(x)+D3=S3a'(x)$$

$$N1b(x)+D3=N1b'(x)+C21+C32$$

$$N2b(x)+D3=N2b'(x)+C32$$

$$S3b(x)+D3=S3b'(x)$$

Although the fluctuation noise D3, which is common to all signals, is added to the obtained values on the left-hand side compared to the case with no fluctuation noise, this fluctuation noise D3 can be removed in the CDS processing to be performed later. Therefore, the photoelectric conversion signals $Pa(x)$ and $Pb(x)$ can be calculated by performing the CDS processing as is.

Thus, the photoelectric conversion signals $Pa(x)$ and $Pb(x)$ to be obtained, which are presented in the expressions (1) and (2), can be converted as follows and obtained from known values.

$$Pa(x)=[\{S2a'(x)+C32\}+S3a'(x)]/2-\{N1a'(x)+C21+C32\}$$

$$Pb(x)=S3b'(x)-[\{N1b'(x)+C21+C32\}+\{N2b'(x)+C32\}]/2$$

As described above, by using the correction values C21 and C32, the signals sampled and held at times sh1 and sh2 and influenced by different fluctuation noise can be adjusted to uniformly have a noise amount corresponding to a fluctuation noise amount generated at time sh3. In the CDS processing to be performed later, the aforementioned fluctuation noise is subtracted from the signals adjusted to have the uniform fluctuation noise amount; as a result, signals in which fluctuation noise has been suppressed can be obtained.

In the present embodiment, by performing these calculation operations in the digital signal processing unit 500, fluctuation noise can be suppressed in addition to random noise. That is to say, it is possible to obtain an image with high image quality in which fluctuation noise has been suppressed in addition to random noise.

Next, a description is given of the operations of the digital camera 1000 configured as shown in FIG. 1.

When a main power source is turned ON, a power source for a control system is turned ON, and a power source for image capturing system circuits, such as the image capture signal processing circuit 1004, is also turned ON.

Thereafter, when a non-illustrated release button is pressed, a shooting operation is started. The shooting element driving circuit 1005 issues a shooting instruction to the image sensor 1001.

Here, as described above, the image sensor 1001 of the present embodiment can suppress fluctuation noise attributed to power source fluctuations and exogenous noise while suppressing random noise, and can consequently capture an image with high image quality.

When the shooting operation has ended, the image capture signal processing circuit 1004 applies image processing to signals output from the image sensor 1001, and the signals are written into the memory unit 1006 according to an instruction from the overall control computation unit 1007.

Under control of the overall control computation unit 1007, image data written into the memory unit 1006 is recorded to the attachable and removable recording medium 1009, such as a semiconductor memory, via the recording medium control I/F unit 1008. Also, the image data may be directly input to a computer and the like via a non-illustrated external I/F unit to undergo image processing.

As described above, according to the first embodiment, an image with high image quality can be recorded without being influenced by power source fluctuations, exogenous noise, and the like.

Second Embodiment

Next, a second embodiment of the present invention will be described. An image sensor used in the second embodiment includes unit pixels with a configuration in which a plurality of PDs share one FD. Here, the pixel configuration in which a plurality of PDs share one FD has, for example, a purpose of reducing the size of a pixel circuit per pixel, and a purpose of obtaining a signal for autofocus (hereinafter AF) using a configuration in which a plurality of PDs share one microlens.

Figure 7:
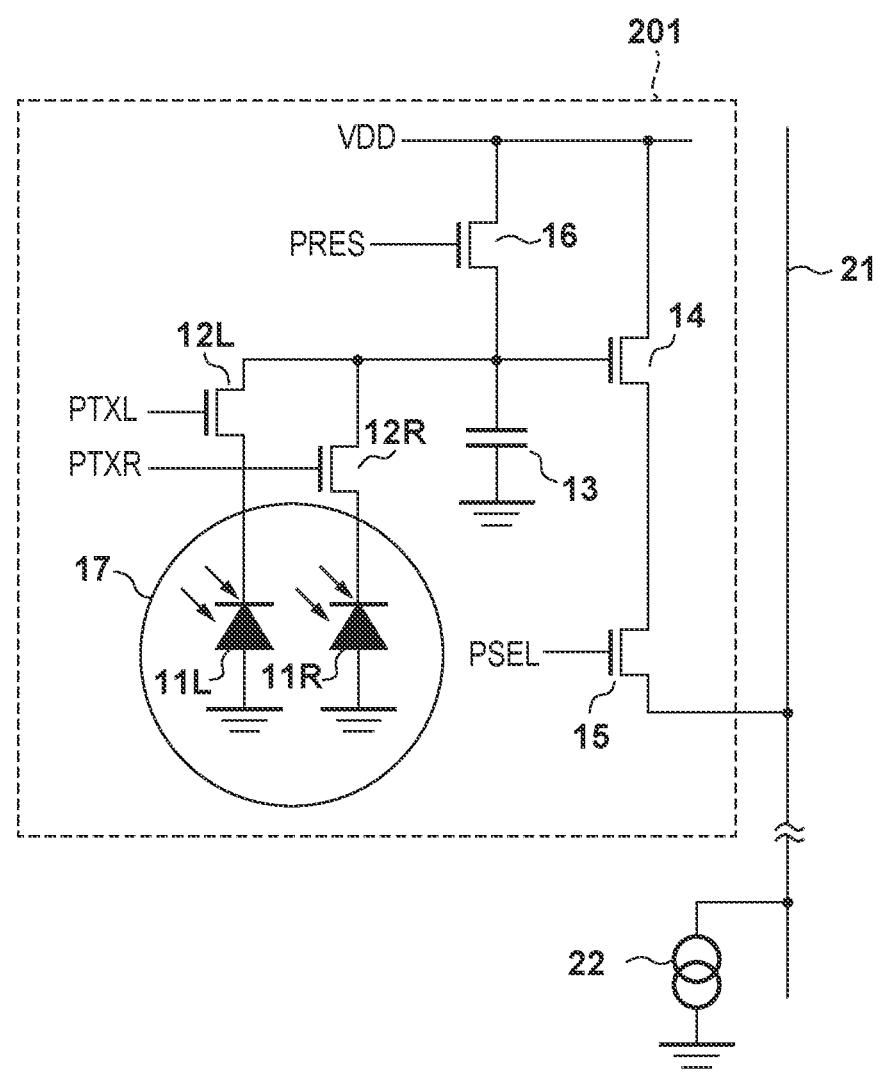
FIG. 7 is a diagram showing a configuration of a pixel circuit according to a second embodiment.

FIG. 7 is a diagram showing a circuit configuration of one pixel in the image sensor according to the present embodiment. The difference from the unit pixels 101 of the first embodiment is that one unit pixel 201 includes two PDs (photoelectric conversion units) 11L and 11R and corresponding transfer switches 12L and 12R, and one FD 13 is shared. Also, the unit pixel 201 includes a microlens 17, and the PDs 11L and 11R are configured to receive light incident from different pupil regions of a photographing lens. Other constituent elements are similar to those of the first embodiment, and thus their descriptions are omitted.

Here, in a state where the FD 13 has been reset using a reset pulse PRES, an amplification transistor 14 outputs a reset signal to a vertical output line 21. Also, when one of the charges generated by the PD 11L and the PD 11R (the charge of subset of the photoelectric conversion units) has been transferred using a transfer pulse PTXL or a transfer pulse PTXR, a phase-difference detection signal for focus detection, including a photoelectric conversion signal of one of the PDs, is output. Furthermore, when both of the charges generated by the PD 11L and the PD 11R have been transferred using the transfer pulse PTXL or the transfer pulse PTXR, an image capture signal (image signal) including photoelectric conversion signals of all PDs included in the unit pixel 201 is output.

Figure 8:
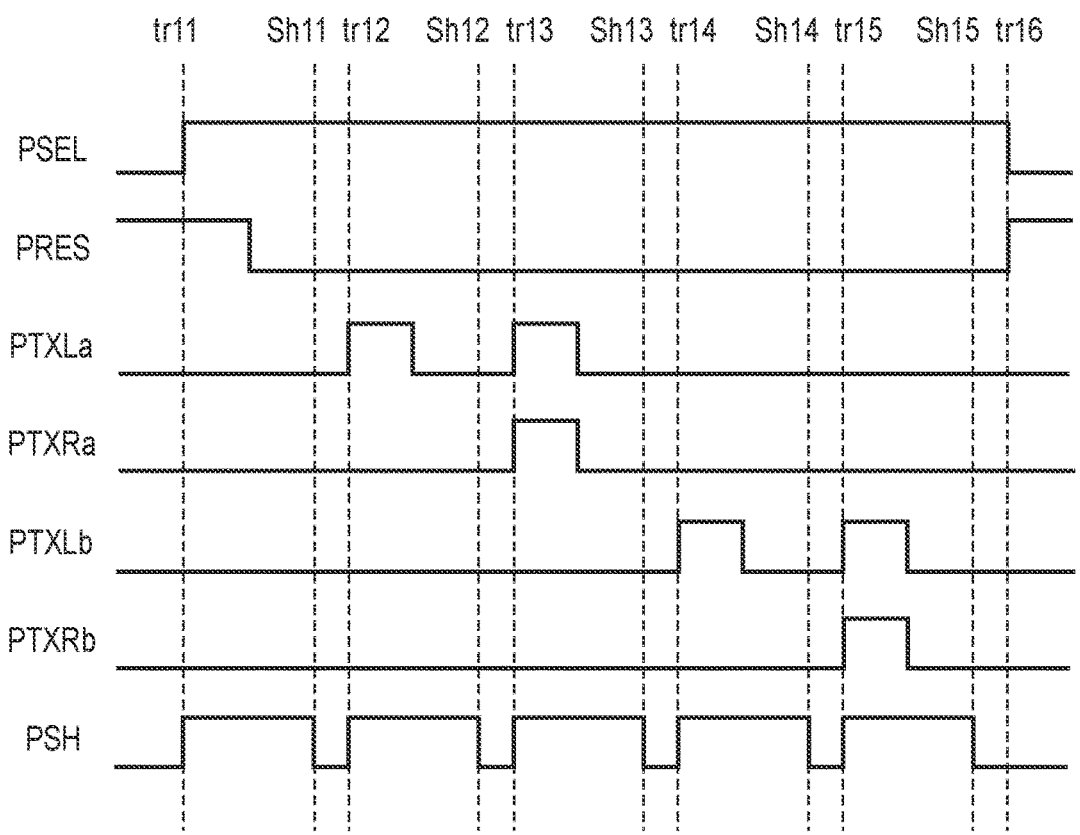
FIG. 8 is a timing chart showing signal readout operations according to the second embodiment.

FIG. 8 is a timing chart showing signal readout operations according to the present embodiment.

From time tr11 to time tr16, which is a readout period, PSEL for rows to be read out is "H", and unit pixels 201a and 201b in the rows to be read out respectively output signals to corresponding vertical output lines 21a and 21b.

At time tr11, PRES is in the "H" state, an unnecessary charge of the FD 13 is discharged, and the potential of the FD 13 is reset. Thereafter, PRES becomes "L". At this time, the unit pixels 201a and 201b output reset signals to the vertical output lines 21a and 21b. Also, at time tr11, a control signal PSH enters the "H" state, and a sample and hold unit 300 samples the signals output from a signal amplification unit 200.

Thereafter, at time sh11, the control signal PSH becomes "L", and the sample and hold unit 300 holds the reset signals output from the signal amplification unit 200 and outputs them to an AD conversion unit 400. The AD conversion unit 400 applies AD conversion to the signals held by the sample and hold circuit 300.

Thereafter, at time tr12, a transfer pulse PTXLa becomes "H", and the charge stored in the PD 11L included in the unit pixel 201a is transferred to the FD 13. Then, the transfer pulse PTXLa becomes "L", and the unit pixel 201a outputs a phase-difference detection signal to the vertical output line 21a. On the other hand, the unit pixel 201b remains in the state where it outputs the reset signal.

Also, at time tr12, the control signal PSH enters the "H" state, and the sample and hold unit 300 samples the signals output from the signal amplification unit 200. Thereafter, at time sh12, the control signal PSH becomes "L", and the sample and hold unit 300 holds the reset signal of the unit pixel 201b and the phase-difference detection signal of the unit pixel 201a output from the signal amplification unit 200, and outputs them to the AD conversion unit 400. The AD conversion unit 400 applies the AD conversion to the signals held by the sample and hold circuit 300.

Thereafter, at time tr13, the transfer pulse PTXLa and the transfer pulse PTXRa become "H", and the charges stored in the PD 11L and the PD 11R included in the unit pixel 201a are transferred to the FD 13. Then, the transfer pulse PTXLa and the transfer pulse PTXRa become "L", and the unit pixel 201a outputs an image capture signal to the vertical output line 21a. On the other hand, the unit pixel 201b remains in the state where it outputs the reset signal.

Also, at time tr13, the control signal PSH enters the "H" state, and the sample and hold unit 300 samples the signals output from the signal amplification unit 200. Thereafter, at time sh13, the control signal PSH becomes "L", and the sample and hold unit 300 holds the reset signal of the unit pixel 201b and the image capture signal of the unit pixel 201a output from the signal amplification unit 200, and outputs them to the AD conversion unit 400. The AD conversion unit 400 applies the AD conversion to the signals held by the sample and hold circuit 300.

Thereafter, at time tr14, a transfer pulse PTXLb becomes "H", and the charge stored in the PD 11L included in the unit pixel 201b is transferred to the FD 13. Then, the transfer pulse PTXLb becomes "L", and the unit pixel 201b outputs a phase-difference detection signal to the vertical output line 21b. On the other hand, the unit pixel 201a remains in the state where it outputs the image capture signal.

Also, at time tr14, the control signal PSH enters the "H" state, and the sample and hold unit 300 samples the signals output from the signal amplification unit 200. Thereafter, at time sh14, the control signal PSH becomes "L", and the sample and hold unit 300 holds the phase-difference detection signals of the unit pixel 201b and the image capture signal of the unit pixel 201a output from the signal amplification unit 200, and outputs them to the AD conversion unit 400. The AD conversion unit 400 applies the AD conversion to the signals held by the sample and hold circuit 300.

Thereafter, at time tr15, the transfer pulse PTXLb and the transfer pulse PTXRb become "H", and the charges stored in the PD 11L and the PD 11R included in the unit pixel 201b are transferred to the FD 13. Then, the transfer pulse PTXLb and the transfer pulse PTXRb become "L", and the unit pixel 201b outputs an image capture signal to the vertical output line 21a. On the other hand, the unit pixel 201a remains in the state where it outputs the image capture signal.

Also, at time tr15, the control signal PSH enters the "H" state, and the sample and hold unit 300 samples the signals output from the signal amplification unit 200. Thereafter, at time sh15, the control signal PSH becomes "L", and the sample and hold unit 300 holds the image capture signals of the unit pixels 201a and 201b output from the signal amplification unit 200, and outputs them to the AD conversion unit 400. The AD conversion unit 400 applies the AD conversion to the signals held by the sample and hold circuit 300. The signal readout operations of the present embodiment are executed through the foregoing operations.

The reset signals, the phase-difference detection signals, and the image capture signals read out through the foregoing operations thereafter undergo correlated double sampling (CDS) processing in a digital signal processing unit 500. Specifically, subtracting a digital value of a reset signal from a digital value of a phase-difference detection signal makes it possible to extract only a signal amount obtained through the photoelectric conversion in the PD 11L. Also, subtracting a digital value of a reset signal from a digital value of an image capture signal makes it possible to extract only a signal amount obtained through the photoelectric conversion in both the PD 11L and the PD 11R. Meanwhile, similarly to the first embodiment, the aforementioned signals are influenced by fluctuation noise, and this fluctuation noise cannot be removed by the aforementioned CDS processing. Therefore, in the present embodiment, processing for suppressing fluctuation noise is performed.

Figure 9:
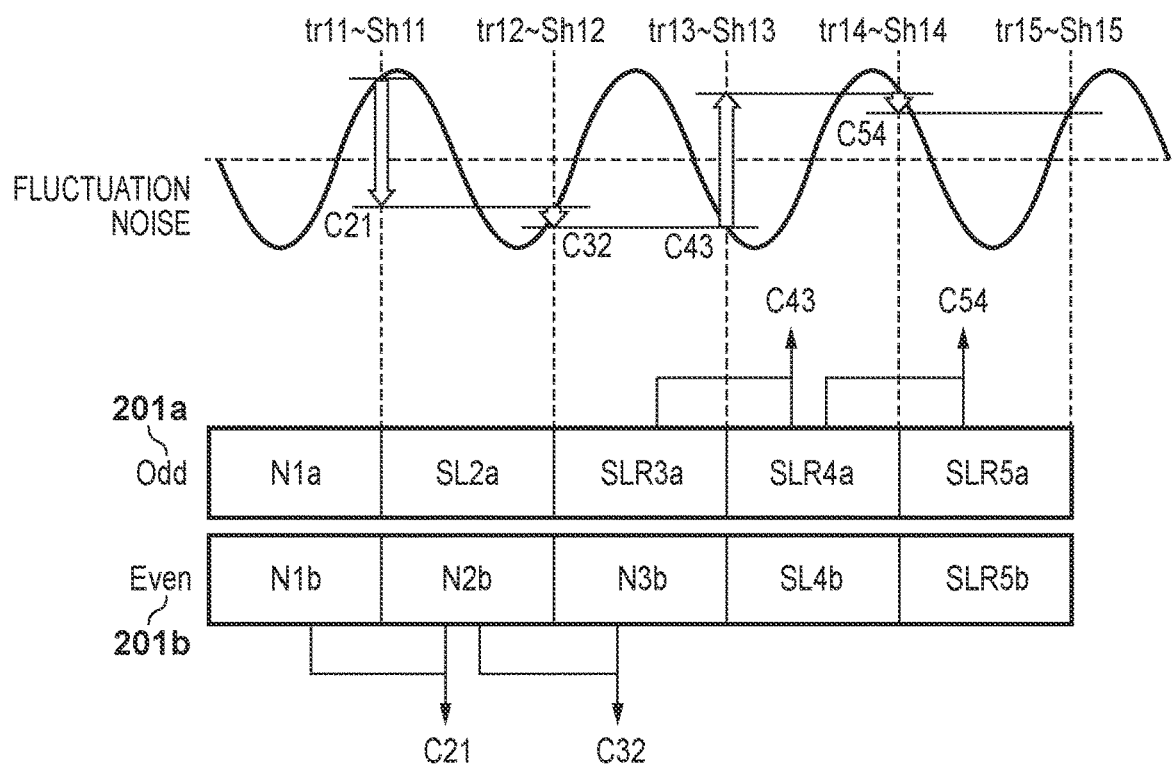
FIG. 9 is a diagram showing timings for obtaining correction values according to the second embodiment.

FIG. 9 is a diagram showing a relationship between a sample and hold operation in the readout operations that have been described with reference to FIG. 8 and fluctuation noise.

In a period from tr11 to sh11 in FIG. 8, both of the unit pixel 201*a* and the unit pixel 201*b* output the reset signals. The reset signals that are output during this period are represented as N1*a* and N1*b*.

In a period from tr12 to sh12 in FIG. 8, the unit pixel 201*a* outputs the phase-difference detection signal, and the unit pixel 201*b* outputs the reset signal. The phase-difference detection signal and the reset signal that are output during this period are represented as SL2*a* and N2*b*, respectively.

In a period from tr13 to sh13 in FIG. 8, the unit pixel 201*a* outputs the image capture signal and the unit pixel 201*b* outputs the reset signal. The image capture signal and the reset signal that are output during this period are represented as SLR3*a* and N3*b*, respectively.

In a period from tr14 to sh14 in FIG. 8, the unit pixel 201*a* outputs the image capture signal and the unit pixel 201*b* outputs the phase-difference detection signal. The image capture signal and the phase-difference detection signal that are output during this period are represented as SLR4*a* and SL4*b*, respectively.

In a period from tr15 to sh15 in FIG. 8, both the unit pixel 201*a* and the unit pixel 201*b* output the image capture signals. The image capture signals that are output during this period are represented as SLR5*a* and SLR5*b*.

In the readout operations of the present embodiment, the unit pixel 201*b* continuously outputs the reset signals N1*b*, N2*b*, and N3*b* at times sh11, sh12, and sh13, and differences C21 and C32 in a fluctuation noise amount between times sh11 and sh12 and between times sh12 and sh13 can be extracted.

Similarly, the unit pixel 201*a* continuously outputs the image capture signals SLR3*a*, SLR4*a*, and SLR5*a* at times sh13, sh14, and sh15, and differences C43, C54 in a fluctuation noise amount between times sh13 and sh14 and between times sh14 and sh15 can be extracted.

By using these correction values, the signals sampled and held at times sh11, sh12, sh13, and sh14 and influenced by different fluctuation noise can be adjusted to uniformly have a noise amount corresponding to a fluctuation noise amount generated at time sh15. In the CDS processing to be performed later, the aforementioned uniform fluctuation noise is subtracted from the signals adjusted to have the uniform fluctuation noise amount; as a result, fluctuation noise is suppressed.

As described above, according to the present embodiment, fluctuation noise can be suppressed in a pixel configuration in which a plurality of PDs share one FD, and it is possible to obtain an image with high image quality and obtain a highly accurate AF signal.

Third Embodiment

Next, a third embodiment of the present invention will be described. In the second embodiment, the unit pixel 201*b* needs to keep outputting the reset signal while the unit pixel 201*a* outputs the reset signal, the phase-difference detection signal, and the image capture signal. Similarly, the unit pixel 201*a* needs to keep outputting the image capture signal while the unit pixel 201*b* outputs the reset signal, the phase-difference detection signal, and the image capture signal. Therefore, the sampling and holding and the AD conversion are performed five times in two rows in association with signal readout, thereby extending a readout period compared to three times in two rows according to the first embodiment. Meanwhile, in realizing AF, there are cases where phase-difference detection signals of all unit pixels 201 in the pixel array are not necessarily required, and a case where the readout speed, such as the frame rate, is to be prioritized over AF performance. In view of this, a method of accelerating the readout speed is described in the third embodiment.

Figure 10:
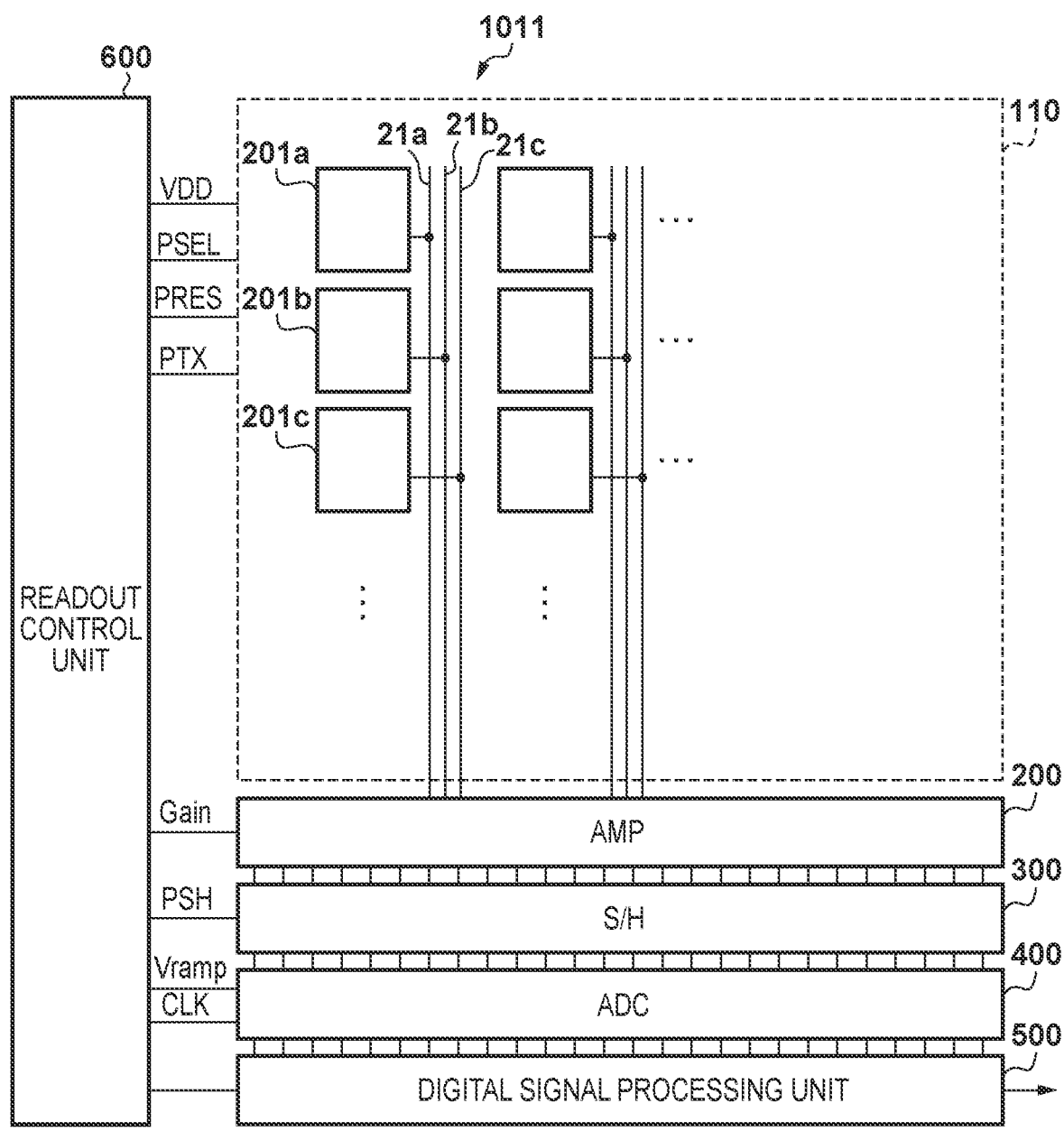
FIG. 10 is a diagram showing a circuit configuration of an image sensor according to a third embodiment.

FIG. 10 is a diagram showing a circuit configuration of an image sensor 1011 of the third embodiment. In a pixel array 110, unit pixels 201 are arrayed in a matrix, and a plurality of vertical output lines 21 are provided per column. Here, in the pixel array 110 according to the present embodiment, three vertical output lines 21*a*, 21*b*, and 21*c* are provided per column of unit pixels. A unit pixel 201*a* that belongs to a pixel group Gr1 is connected to the vertical output line 21*a*, a unit pixel 201*b* that belongs to a pixel group Gr2 is connected to the vertical output line 21*b*, and a unit pixel 201*c* that belongs to a pixel group Gr3 is connected to the vertical output line 21*c*. In this way, the three lines to which the unit pixels 201*a*, 201*b*, and 201*c* belong can be read out simultaneously. Other constituent elements are similar to those of the image sensor 1001 of the first embodiment, and thus their descriptions are omitted.

Figure 11:
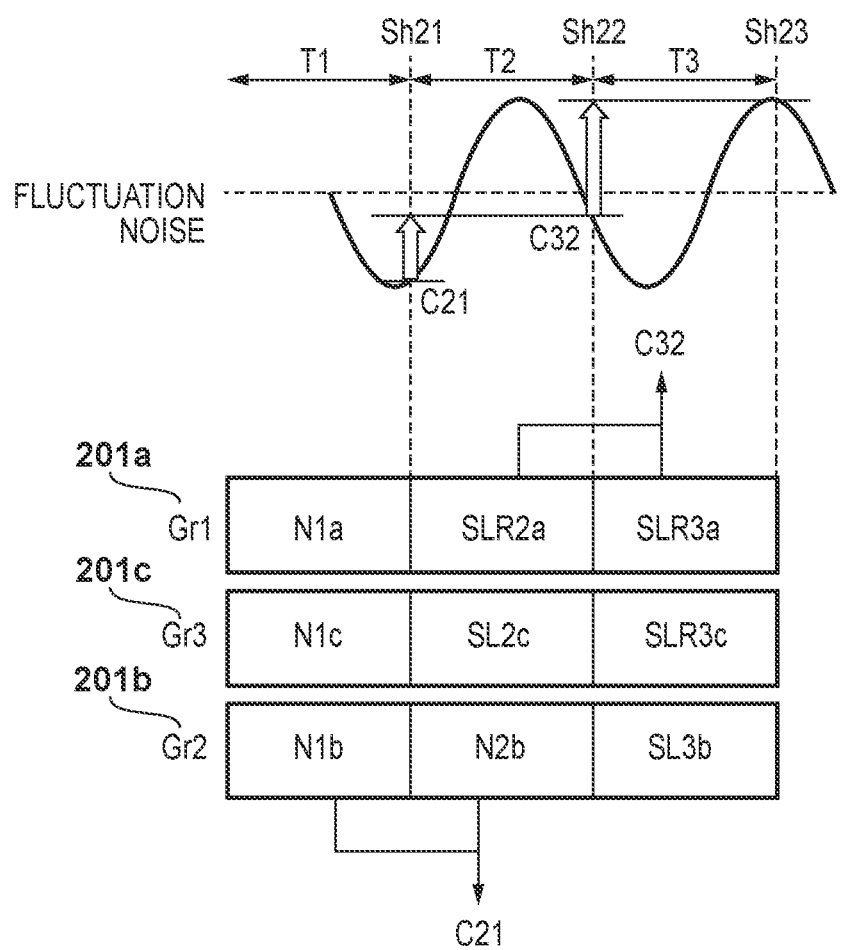
FIG. 11 is a diagram showing timings for obtaining correction values according to the third embodiment.

FIG. 11 is a diagram showing a relationship between readout operations and fluctuation noise in the present embodiment.

In a first period T1, all of the unit pixels 201*a*, 201*b*, and 201*c* output reset signals, which are sampled and held at time sh21. The reset signals that are output during this period are represented as N1*a*, N1*b*, and N1*c*.

In a second period T2, the unit pixel 201*a*, the unit pixel 201*b*, and the unit pixel 201*c* respectively output an image capture signal, a reset signal, and a phase-difference detection signal, which are sampled and held at time sh22. The image capture signal, the reset signal, and the phase-difference detection signal that are output during this period are represented as SLR2*a*, N2*b*, and SL2*c*, respectively.

In a third period T3, all of the unit pixels 201*a*, 201*b*, and 201*c* output image capture signals, which are sampled and held at time sh23. The image capture signals that are output during this period are represented as SLR3*a*, SLR3*b*, and SLR3*c*.

In the readout operations of the present embodiment, the unit pixel 201*b* continuously outputs the reset signals N1*b* and N2*b*, at times sh21 and sh22, and a difference C21 in a fluctuation noise amount between times sh21 and sh22 can be extracted.

Similarly, the unit pixel 201*a* continuously outputs the image capture signals SLR2*a* and SLR3*a* at times sh22 and sh23, and a difference C32 in a fluctuation noise amount between times sh22 and sh23 can be extracted.

By using these correction values, the signals sampled and held at times sh21 and sh22 and influenced by different fluctuation noise can be adjusted to uniformly have a noise amount corresponding to a fluctuation noise amount generated at time sh23. In the CDS processing to be performed later, the aforementioned uniform fluctuation noise is subtracted from the signals adjusted to have the uniform fluctuation noise amount; as a result, fluctuation noise is suppressed.

As described above, in the present embodiment, the pixel groups from which the correction values for removal of fluctuation noise are obtained are separated from the pixel group from which the phase-difference detection signal is obtained in addition to the image capture signal. This can increase the readout speed while realizing the suppression of fluctuation noise and the obtainment of the phase-difference detection signal.

Although three vertical output lines are provided per column in the configuration of the present embodiment, when there are four or more vertical output lines, the noise reduction effect may be enhanced by augmenting the pixel groups Gr1 and Gr2, or the AF accuracy may be enhanced by augmenting the pixel group Gr3. Alternatively, the ratio of the pixel groups Gr1, Gr2, and Gr3 may be switched depending on settings at the time of shooting or a subject.

Fourth Embodiment

Next, a fourth embodiment of the present invention will be described. In the present embodiment, a description is given of a method of obtaining equivalent effects through readout operations that are different from those of the first embodiment.

Figure 12:
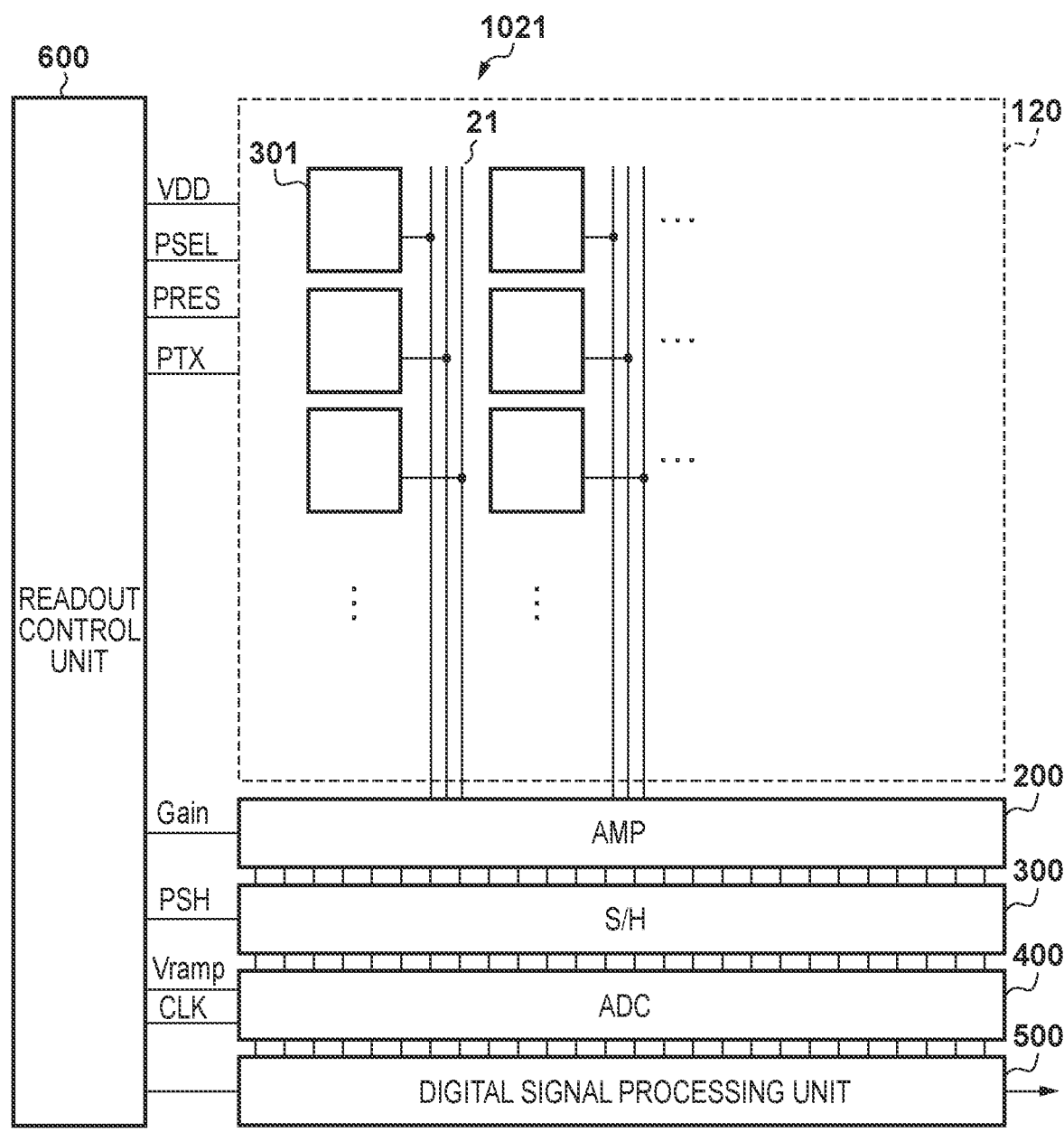
FIG. 12 is a diagram showing a circuit configuration of an image sensor according to a fourth embodiment.

FIG. 12 is a diagram showing a circuit configuration of an image sensor 1021 of the fourth embodiment. In a pixel array 120 of the present embodiment, unit pixels 301 are arrayed in a matrix, and a plurality of vertical output lines 21 are provided per column. Here, in the pixel array 120 according to the present embodiment, three vertical output lines 21 are provided per column of unit pixels, and three rows can be read out simultaneously. Other constituent elements are similar to those of the image sensor 1001 of the first embodiment, and thus their descriptions are omitted.

Figure 13:
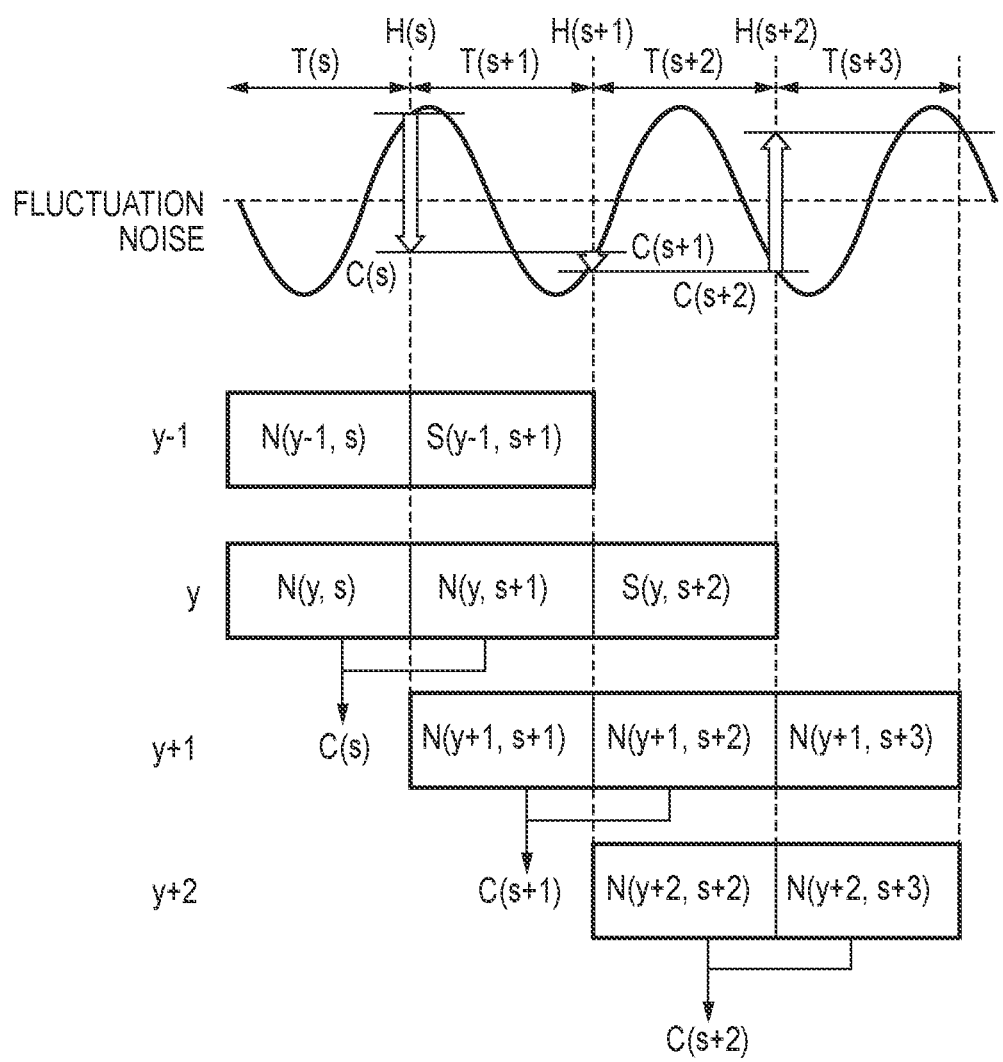
FIG. 13 is a diagram showing timings for obtaining correction values according to the fourth embodiment.

FIG. 13 is a diagram showing a relationship between readout operations and fluctuation noise according to the present embodiment. A readout operation for a unit pixel 301 at a certain row address y is composed of three signal readout sessions.

Provided that three signal readout periods are T(s), T(s+1), and T(s+2), a reset signal N(y,s), a reset signal N(y,s+1), and a transfer signal S(y,S+2) are read out in the respective periods in this order. The foregoing signals are respectively held at sample and hold times H(s), H(s+1), and H(s+2).

In the readout operation at the row address y, the reset signals are continuously output at the sample and hold times H(s) and H(s+1), thereby making it possible to obtain a correction value C(s), which is a difference between the fluctuation noise amounts generated at the foregoing times. Furthermore, as the reset signal is sampled twice, summing and averaging these reset signals can suppress the influence of random noise, such as thermal noise and RTS noise.

However, as different signals are output at the sample and hold times H(s+1) and H(s+2), a correction value C(s+1), which is a difference between the fluctuation noise amounts generated at the foregoing times, cannot be obtained. On the other hand, at a row address y+1, signal readout is started from a signal readout period T(s+1).

That is to say, a reset signal N(y+1, s+1), a reset signal N(y+1, s+2), and a transfer signal S(y+1, s+3) are respectively output in signal readout periods T(s+1), T(s+2), and T(s+3).

In the readout operation at the row address y+1, the reset signals are continuously output at the sample and hold times H(s+1) and H(s+2), thereby making it possible to obtain a correction value C(s+1), which is a difference between the fluctuation noise amounts that were generated at the foregoing times.

Therefore, using the correction values C(s), C(s+1), the signals at the row address y can be adjusted to uniformly have a noise amount corresponding to a fluctuation noise amount at the sample and hold time H(s+2). In the CDS processing to be performed later, the aforementioned uniform fluctuation noise is subtracted from the signals adjusted to have the uniform fluctuation noise amount; as a result, fluctuation noise is suppressed.

Thereafter, a readout operation at a row address y+2 is started in the readout period T(s+2), and signals at the row address y+1 are corrected by generating a correction value C(s+2) in the readout operation at the row address y+2. By starting a readout operation sequentially on a per-row basis through the repetition of the foregoing operations, fluctuation noise is suppressed in addition to random noise, and an image with high image quality can be obtained.

Fifth Embodiment

Next, a fifth embodiment of the present invention will be described. In the present embodiment, a description is given of how the method described in the fourth embodiment is applied to an image sensor that includes unit pixels with a configuration in which a plurality of PDs share one FD.

Figure 14:
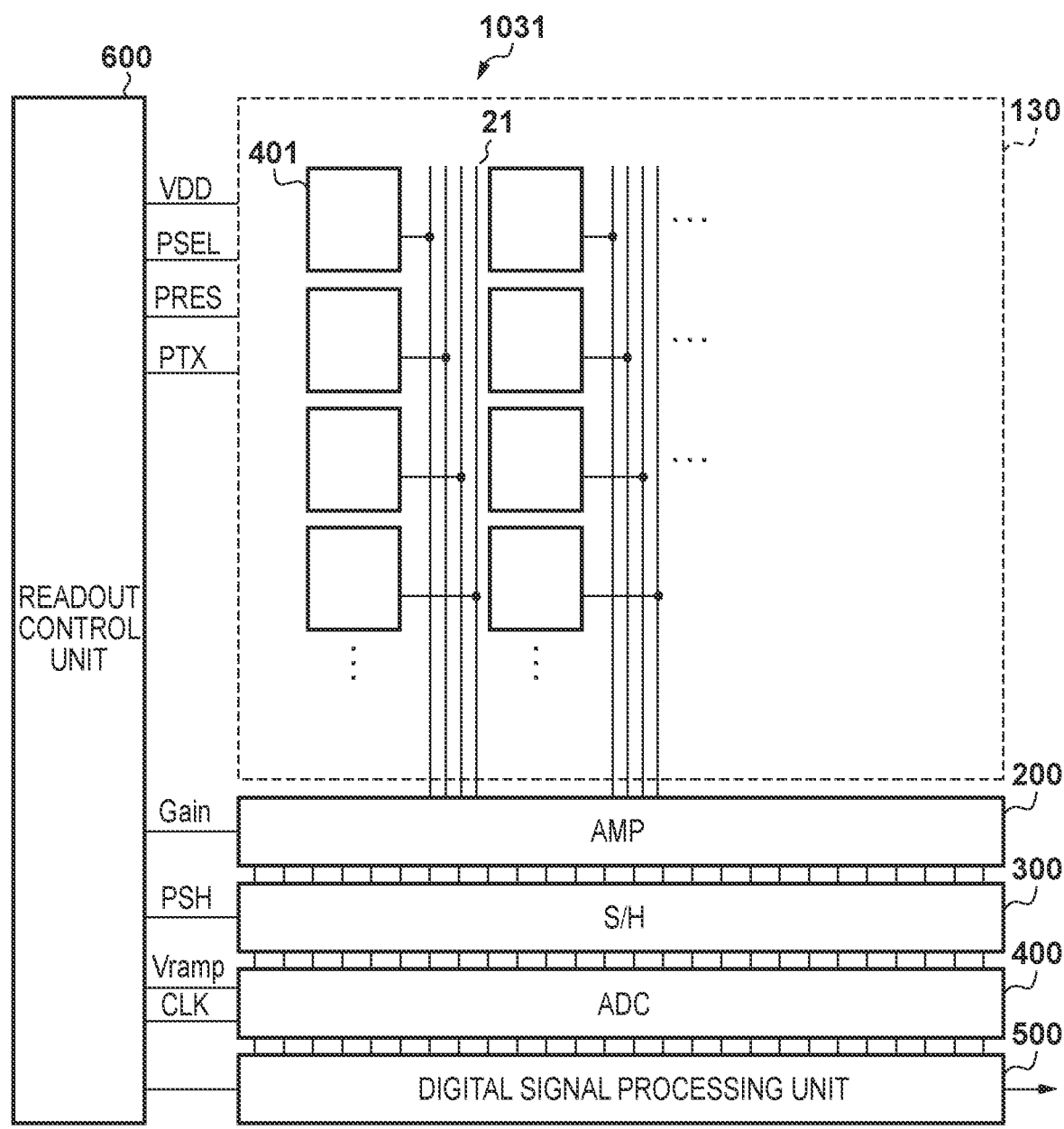
FIG. 14 is a diagram showing a circuit configuration of an image sensor according to a fifth embodiment.

FIG. 14 is a diagram showing a circuit configuration of an image sensor 1031 of the fifth embodiment. In a pixel array 130 of the present embodiment, unit pixels 401 are arrayed in a matrix, and a plurality of vertical output lines 21 are provided per column. Here, in the pixel array 130 according to the present embodiment, four vertical output lines 21 are provided per column of unit pixels, and four rows can be read out simultaneously. Other constituent elements are similar to those of the image sensor 1011 of the third embodiment, and thus their descriptions are omitted.

Figure 15:
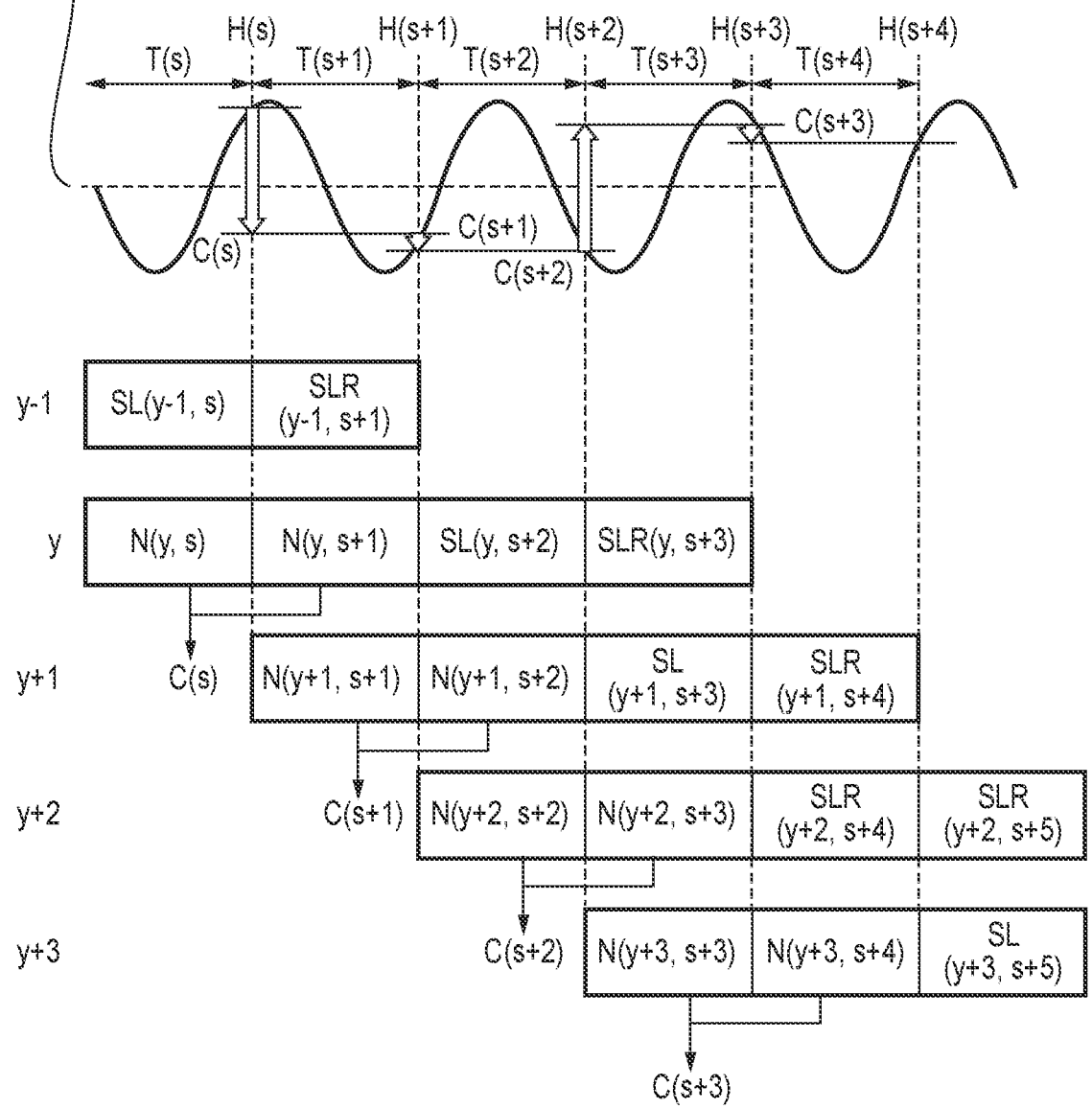
FIG. 15 is a diagram showing timings for obtaining correction values according to the fifth embodiment.

FIG. 15 is a diagram showing a relationship between readout operations and fluctuation noise according to the present embodiment.

A readout operation for a unit pixel 401 at a certain row address y is composed of four signal readout sessions. Provided that four signal readout periods are T(s), T(s+1), T(s+2), and T(s+3), a reset signal N(y,s), a reset signal N(y,s+1), a phase-difference detection signal SL(y,S+2), and an image capture signal SLR(y,S+3) are read out in this order. The foregoing signals are respectively held at sample and hold times H(s), H(s+1), H(s+2), and H(s+3).

In the readout operation at the row address y, the reset signals are continuously output at the sample and hold times H(s) and H(s+1), thereby making it possible to obtain a correction value C(s), which is a difference between the fluctuation noise amounts generated at the foregoing times.

However, as different signals are output at the sample and hold times H(s+1), H(s+2) and H(s+3), correction values C(s+1), C(s+2), which are differences between the fluctuation noise amounts that were generated at the foregoing times, cannot be obtained.

On the other hand, at a row address y+1, signal readout is started from a signal readout period T(s+1).

That is to say, a reset signal N(y+1, s+1), a reset signal N(y+1, s+2), a phase-difference detection signal SL(y+1, s+3), and an image capture signal SLR(y+1, s+4) are respectively output in signal readout periods T(s+1), T(s+2), T(s+3), and T(s+4).

In a readout operation at the row address y+1, the reset signals are continuously output at the sample and hold times H(s+1) and H(s+2), thereby making it possible to obtain the correction value C(s+1), which is a difference between the fluctuation noise amounts generated at the foregoing times.

Similarly, at a row address y+2, similar signal readout is started from the signal readout period T(s+2), thereby making it possible to obtain the correction value C(s+2), which is a difference between the fluctuation noise amounts generated at the sample and hold times H(s+2) and H(s+3).

Therefore, using the correction values C(s), C(s+1), and C(s+2), the signals at the row address y can be adjusted to uniformly have a noise amount corresponding to a fluctuation noise amount at the sample and hold time H(s+3). In the CDS processing to be performed later, the aforementioned uniform fluctuation noise is subtracted from the signals adjusted to have the uniform fluctuation noise amount; as a result, fluctuation noise is suppressed.

Thereafter, a readout operation at a row address y+3 is started in a readout period T(s+3), and signals at the row address y+1 are corrected by generating a correction value C(s+3) in the readout operation at the row address y+3.

By starting a readout operation sequentially on a per-row basis through the repetition of the foregoing operations, fluctuation noise can be suppressed; as a result, it is possible to obtain an image with high image quality and obtain a highly accurate AF signal.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-071508, filed Apr. 3, 2019 which is hereby incorporated by reference herein in its entirety.

What is claimed is:

1. An image capturing apparatus comprising:
a pixel portion in which a plurality of pixels are arranged in a matrix;
vertical output lines arranged in such a manner that a plurality of vertical output lines are provided for each pixel column in the pixel portion, each of the plurality of vertical output lines provided for one pixel column being connected to a pixel in different rows within the one pixel column; and
a readout circuit configured to, when simultaneously reading out signals of pixels in a plurality of rows within the one pixel column using the plurality of vertical output lines provided within the one pixel column, continuously read out same signals multiple times with respect to at least a pixel in one row among the pixels in the plurality of rows.

2. The image capturing apparatus according to claim 1, further comprising
a detection circuit configured to detect temporally fluctuating noise based on values of the same signals read out at temporally different timings as a result of being continuously read out multiple times by the readout circuit.

3. The image capturing apparatus according to claim 2, further comprising
a correction circuit configured to correct the signals of the pixels based on the fluctuating noise detected by the detection circuit.

4. The image capturing apparatus according to claim 2, wherein
the detection circuit detects temporally fluctuating noise based on differences between the same signals read out at the temporally different timings.

5. The image capturing apparatus according to claim 4, further comprising
an averaging circuit configured to sum and average the differences between the same signals read out at the temporally different timings with respect to a plurality of pixels in the same row that have been read out at the same timing.

6. The image capturing apparatus according to claim 1, wherein
the readout circuit continuously reads out, multiple times, same signals obtained by resetting the pixels.

7. The image capturing apparatus according to claim 1, wherein
the readout circuit continuously reads out, multiple times, same signals obtained by exposing the pixels to light.

8. The image capturing apparatus according to claim 1, wherein
the pixels include a plurality of photoelectric conversion units.

9. The image capturing apparatus according to claim 8, wherein
the readout circuit continuously reads out, multiple times, signals of a portion of the plurality of photoelectric conversion units.

10. The image capturing apparatus according to claim 8, wherein
the readout circuit continuously reads out, multiple times, signals of all of the plurality of photoelectric conversion units.

11. The image capturing apparatus according to claim 8, further comprising
a phase-difference detection circuit configured to detect a phase difference for focus detection using signals of a portion of the plurality of photoelectric conversion units and signals of another portion of the plurality of photoelectric conversion units.

12. The image capturing apparatus according to claim 8, further comprising
a generation circuit configured to generate an image signal using signals of all of the plurality of photoelectric conversion units.

13. A method of controlling an image capturing apparatus including a pixel portion in which a plurality of pixels are arranged in a matrix, and vertical output lines arranged in such a manner that a plurality of vertical output lines are provided for each pixel column in the pixel portion, each of the plurality of vertical output lines provided for one pixel column being connected to a pixel in different rows within the one pixel column, the method comprising:

when simultaneously reading out signals of pixels in a plurality of rows within the one pixel column using the plurality of vertical output lines provided within the one pixel column, continuously reading out same signals multiple times with respect to at least a pixel in one row among the pixels in the plurality of rows.

14. A non-transitory computer-readable storage medium having stored therein a program for causing a computer to execute a method of controlling an image capturing apparatus including a pixel portion in which a plurality of pixels are arranged in a matrix, and vertical output lines arranged in such a manner that a plurality of vertical output lines are provided for each pixel column in the pixel portion, each of the plurality of vertical output lines provided for one pixel column being connected to a pixel in different rows within the one pixel column, the method comprising:

when simultaneously reading out signals of pixels in a plurality of rows within the one pixel column using the plurality of vertical output lines provided within the one pixel column, continuously reading out same signals multiple times with respect to at least a pixel in one row among the pixels in the plurality of rows.

* * * * *